United States Patent [19]

Herzog

[11] Patent Number: 4,702,306

[45] Date of Patent: Oct. 27, 1987

[54] APPARATUS FOR CONTROLLING A PROCESS VARIABLE OF A FLOWING MEDIUM

[75] Inventor: Rudolf Herzog, Tobel, Switzerland

[73] Assignee: Sulzer Brothers Limited, Winterthur, Switzerland

[21] Appl. No.: 681,182

[22] Filed: Dec. 13, 1984

[30] Foreign Application Priority Data

Dec. 21, 1983 [CH] Switzerland ............... 6812/83

[51] Int. Cl.⁴ .................................. G05D 23/00
[52] U.S. Cl. ........................... 165/36; 165/35; 165/40; 364/137; 236/24
[58] Field of Search .......... 165/35, 36, 40; 236/23, 236/34.5, 24; 137/88, 89; 364/137

[56] References Cited

U.S. PATENT DOCUMENTS

| 2,788,264 | 4/1957 | Bremer et al. | 165/35 |
| 3,086,504 | 4/1963 | Profos | 236/23 |
| 3,096,744 | 7/1963 | Profos | 236/24 |
| 3,213,929 | 10/1965 | Marshall et al. | 165/35 |
| 3,322,938 | 5/1967 | Weiss | 165/36 |
| 3,470,069 | 9/1969 | Bracken et al. | 236/23 |
| 3,645,697 | 2/1972 | Hoffman, Jr. | 165/36 |
| 4,381,814 | 5/1983 | Funk | 165/40 |
| 4,449,569 | 5/1984 | Lisi et al. | 165/36 |

FOREIGN PATENT DOCUMENTS

| 0065033 | 11/1982 | European Pat. Off. | 236/24 |
| 3102791 | 8/1982 | Fed. Rep. of Germany | 236/24 |
| 0069323 | 4/1982 | Japan | 236/24 |
| 0716024 | 2/1980 | U.S.S.R. | 137/88 |

OTHER PUBLICATIONS

Anderson, N. A., *Instrumentation for Process Measurement and Control*, Chilton, Penna., 3rd Edition, 1980, pp. 352-357.
Wills, D. M., "Cascade Control, When, Why and How" System Design, Sept. 1961, pp. 37-39.

Primary Examiner—Albert W. Davis, Jr.
Assistant Examiner—John K. Ford
Attorney, Agent, or Firm—Kenyon & Kenyon

[57] ABSTRACT

The plant has a controlled section through which water flows, for example, for cooling or heating purposes. The operation of the controlled section is controlled by obtaining temperature measurements of the flow via a pair of temperature sensors and emitting a control signal in response to a difference to a valve in a connecting line which is in parallel with the heat exchanger. The same signal is also directed to a comparator in a control circuit within which a second process variable, i.e. flow quantity, is measured. A comparison between these latter signals is made and a resulting difference signal is used by a controller to adjust a valve in the feed line to the heat exchanger to adjust the flow of medium. Should the temperature of the flow downstream of the junction point of the connecting line and heat exchanger increase, the valve in the connecting line is moved in closing direction to increase the flow to the heat exchanger and at the same time, the valve in the feed line is further opened to additionally increase the flow to the heat exchanger. Shortly thereafter, this increase in flow causes the valve in the feed line to be moved back in closing direction.

11 Claims, 3 Drawing Figures

APPARATUS FOR CONTROLLING A PROCESS VARIABLE OF A FLOWING MEDIUM

This invention relates to an apparatus for controlling a process variable of a flowing medium. More particularly, this invention relates to an apparatus for controlling the process variables of a medium flowing through a heat exchanger.

Heretofore, it has been known to control a process variable of a medium flowing through a controlled section of a plant by determining a variation in the process variable and making adjustments in accordance with the measured difference. For example, where the controlled section of a plant has a heat exchanger to which a medium feed line is connected and from which a medium discharge line extends, it has been known to connect a connecting line to and between the feed line and discharge line in parallel to the heat exchanger with a first throttle member placed in the medium flow through the controlled section and a second throttle member disposed in the connecting line. In order to control the process variable, at least two measuring members for the process variable have been provided in the controlled section to give at least two different measurements of the process variable in normal operation. In addition, a comparator has been provided to compare the measurement from the measuring members and to produce a differential signal in response to a deviation between the received signals.

In such a construction, where the output temperature is to be controlled, both the first and second throttle members have been controlled directly by the signal at an output of the comparator. As a result, the two throttle members are linked by a fixed law and can be actuated only in mutual dependence. The linking function has been selected so that one throttle member closes and the other opens, and vice versa. Hence, it is possible for the flow through the heat exchanger to be kept constant for a given controlled section load with opposed directions of flow in the heat exchanger and in the connecting line. However, one disadvantage of such an apparatus is that the apparatus reacts to disturbances with great inertia.

Accordingly, it is an object of the invention to provide an apparatus for controlling a process variable which is able to react rapidly to disturbances.

It is another object of the invention to be able to control a process variable of a flowing medium passing through a heat exchanger in a rapid manner.

Briefly, the invention is directed to an apparatus for use with a plant having a controlled section through which a flowable medium flows. For example, the controlled section includes a heat exchanger, a medium feed line connected to the heat exchanger to deliver a flow of medium thereto, a medium discharge line connected to the heat exchanger to discharge a flow of medium therefrom and a connecting line connected to and between the feed line and discharge line in parallel to the heat exchanger. In addition, a first throttle member is disposed in the feed line or the discharge line to control the flow therethrough while a second throttle member is disposed in the connecting line to control the flow therethrough.

In accordance with the invention, a means is provided for controlling a first process variable of the medium delivered to the discharge line along with a control circuit for controlling a second process variable of the medium. The means for controlling the first process variable includes at least two measuring members for individually measuring two different values of the first process variable at normal load of the control section and emitting corresponding signals and a comparator which is connected to the measuring members to compare the signals and to emit a differential signal in response to a change in the difference between the emitted signals from the measuring members.

The control circuit includes a third measuring member for measuring the second process variable of the medium in the controlled section and emitting a corresponding signal.

In addition, the control circuit has a controller connected to and between the third measuring member and the first throttle member in order to adjust the first throttle member in response to the signal of the third measuring member.

The comparator of the means for controlling the first process variable is connected to the second throttle member in order to deliver the differential signal thereto in order to adjust the flow of medium in the connecting line. The comparator is also connected to the control circuit to deliver the differential signal thereto.

In operation, in the event of a disturbance, the two throttle members are each initially actuated by a signal dependent upon the first process variable and independently of one another. Thus, it is possible to change the relative proportions of cold and hot medium flowing the controlled section and then, for example, to change the quantity flowing through the heat exchanger. This latter change can be temporary, if required, but very rapid. The overall effect is a very rapid reaction to disturbances.

Additional important advantages of the apparatus according to the invention are as follows:

Each throttle member is actuated independently of the other in optimum manner, i.e. in accordance with its own characteristics.

The fact that the two throttle members can be used independently of one another gives a considerable control structure reserve for any improvements to the control system.

Operation of the controlled section is greatly simplified by the more overseeable control conditions. In particular, it is a simple matter to control the flow through the heat-exchanger.

In the frequent case in which steam or gas is used as a flowing medium and the outlet temperature is controlled, the deviations of the outlet temperature from a set-value are less than in the prior art, so that the maximum pressures are smaller. As a result, pumps, fans, accumulator tanks, pressure controllers, pipelines and other components in which the medium circulates can be made smaller or lighter in weight, with considerable savings.

The comparator which is used to compare the measurements of the first process variable may have a PI characteristic. In addition, a first signal line may extend from this comparator to the control circuit in order to carry the first differential signal thereto while a second signal line is connected directly from the comparator to the second throttle member. In addition, a P-member may be disposed in the first signal line. This construction provides a very gentle asymptotic curve per unit of time for the first process variable without any abrupt transitions.

The third measuring member may also be connected to the first comparator in order to deliver the measurement signal thereto for comparison with the signals received from the first two measuring members. This provides for a considerable improvement in the control characteristic per unit of time. This supplies particularly when the second process variable is the flow in the heat exchanger since this variable has considerable influence on heat processes such as, for heat exchange.

The first throttle member may be disposed in the feed line upstream of the junction point at which the connecting line connects while a pressure accumulator is disposed in the feed line upstream of the throttle member. This arrangement results in the medium flow in the controlled section being quieted and thus improves the measurement condition, measurement results and control quality together with the throttle member working conditions.

A pump may also be provided in the feed line between the connecting line and the heat exchanger so that the medium in the discharge line may flow through the connecting line to the feed line. In this case, the quantity flowing through the heat exchanger is greater than the quantity flowing to or from the controlled section. The sensitivity of a controlled section of this kind to short-term variation in heat flow in the heat exchanger is relatively low so that good dynamic control properties predominate. The temperature difference on the medium side across the heat exchanger, for example, is relatively low because of the relatively considerable flow of medium. This, in turn, reduces the outlet temperature deviations.

At least one of the measuring members for the first process variable may be disposed in the discharge line downstream of the connecting line. In this case, the medium would flow from the feed line through the connecting line to the discharge line. Consequently, only part of the total quantity of medium flows through the heat exchanger. Accordingly, the heat exchanger can be particularly compact with respect to overall dimensions. This embodiment also results in a very inexpensive device.

The difference in pressures between the feed line and the discharge line depends on a number of factors, particularly, the type of process carried out in the control section, i.e. whether a gas or vapor is heated or cooled in the heat exchanger, the geodetic head difference between the two lines, whether a pump or a compressor is provided in the controlled section, and on the pressure losses. The pressure difference can therefore be influenced within wide limits so that the choice of the optimum process according to the marginal conditions at any time can be freely made in most applications.

These and other objects and advantages of the invention will become more apparent from the following detailed description taken in conjunction with the accompanying drawings wherein.

Figure 1:
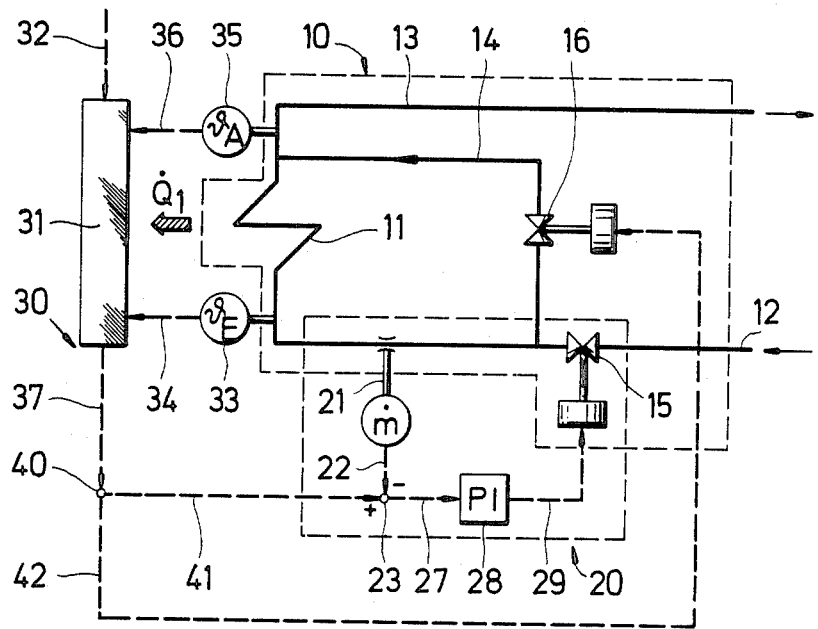
FIG. 1 illustrates a circuit diagram of a plant for cooling heated water constructed in accordance with the invention.

Referring to FIG. 1, the plant has a controlled section 10 for cooling a coolant such as cooling water, a control circuit 20 for controlling the amount of water flowing through the controlled section, and means 30 for controlling the outlet temperature of the section 10.

The controlled section 10 contains a heat-exchanger 11 in which a quantity of heat Q1 is discharged from the cooling water flowing therethrough, e.g. by means of a current of air (not shown). The section 10 also contains a medium feed line 12 connected to the heat exchanger 11 to deliver a flow of cooling water, a medium discharge line 13 connected to the heat exchanger 11 to discharge a flow of cooling water, and a connecting line 14 connected to and between the feed line 12 and the discharge line 13 in parallel to the heat-exchanger 11. A pump (not shonw) delivers cooling water through the feed line 12 to the heat-exchanger 11 and back from the latter through the discharge line 13 to a machine or engine for cooling (not shown).

Upstream of the point where the connecting line 14 branches off, the feed line 12 contains a first controllable throttle member 15 in the form of a valve having an electric motor drive to control the flow through the line 12. The connecting line 14 contains a second controllable throttle member 16, also in the form of a valve with an electric motor drive to control the flow therethrough.

The control circuit 20 includes a measuring member in the form of a flow meter 21 for measuring a process variable of the medium, i.e. the amount of water $\dot{m}$ flowing through the heat-exchanger 11 and transmits the result of the measurement as a signal via a signal line 22 to a comparator 23 in which the measurement signal is compared with a set-value signal fed via a signal line 41. The difference between the two signals is fed as a difference signal via a signal line 27 to a PI-controller 28. This controller 28 is connected to and between the comparator 23 and valve 15 so that an output signal from the controller 28 can be fed via a signal line 29 to the valve 15 and to adjust the valve 15 in response to the differential signal to thus control the total quantity of water flowing through the section 10.

The means 30 comprises at least two measuring members in the form of temperature sensors 33, 35 for individually measuring a process variable, i.e. temperature, as well as a comparator 31 which is connected to the sensors 33, 35. As indicated, one sensor 33 is disposed in the feed line 12 near the heat exchanger 11 in order to measure the inlet temperature. $\theta_E$. A corresponding signal to the measured temperature is emitted via a signal line 34 to the comparator 31. The other sensor 35 is disposed in the discharge line 13 downstream of the point of entry of the connecting line 14. This sensor 35 measures the outlet temperature $\theta_A$ and emits a corresponding signal over a signal line 36 to the comparator 31.

The comparator 31 is also supplied with a set value signal for the outlet temperature of the section 10 via a signal line 32. In operation, the comparator 31 compares the signals received and emits a differential signal in response to a difference between the received signals via a signal line 37. As illustrated, this signal line 37 leads to a branch point 40 from which the signal line 41 extends to the comparator 23 in the control circuit 20 in order to have the differential signal in the line 37 serve as a set value signal for the PI controller 28. A second signal line 42 extends from the branch point 40 directly to the valve 16 in the connecting line 14.

In normal operation of the plant, cooling water flows through the feed line 12, the heat-exchanger 11, the discharge line 13 and the connecting line 14. The quantity of cooling water in the feed line 12 upstream of the point where the connecting line 14 branches off is equal to the quantity of cooling water in the discharge line 13 downstream of the point of entry of the connecting line 14 and each of these quantities is equal to the sum of the quantities of cooling water flowing through the heat-exchanger 11 and the connecting line 14. The cooling water temperature $\theta_E$ and $\theta_A$ are constantly monitored by the temperature sensors 33, 35, while the quantity of water flowing through the heat-exchanger 11 is monitored by the flowmeter 21. The means 30 and the control circuit 20 exert no influence on the valves 15, 16 as long as there is no disturbance to normal operation. Under this condition, the valve 16 is open to such an extent that a mixture consisting of uncooled cooling water flowing through the connecting line 14 and the cooling water cooled in the heat-exchanger 11 have the required outlet temperature in the region of the temperature sensor 35.

In the event of a disturbance which results in an increase in the inlet temperature $\theta_E$, the temperature sensor 33 reports this increase to the comparator 31. This report changes the output signal in the line 37, resulting in direct operation of the valve 16 via the signal line 42 in order to close the valve 16, so that the quantity of water flowing in the connecting line 14 is reduced and the quantity of water flowing to the heat-exchanger 11 is at the same time increased.

The changed output signal in the line 37 also acts via the signal line 41 on the comparator 23, where the signal is compared with the signal coming from the flowmeter 21. The new differential signal resulting here acts on the PI-controller 28, which controls the valve 15 in order to open the valve 15 so that the quantity of water flowing to the heat-exchanger 11 is further increased.

The two operations described initiate a very considerable change in the flow. However, this is operative only for a brief time, because some of the increase in the quantity of cooling water is withdrawn via the rapidly acting quantity control circuit 20, the valve 15 being influenced to close via the PI-controller 28 through the agency of the flowmeter 21.

Figure 3:
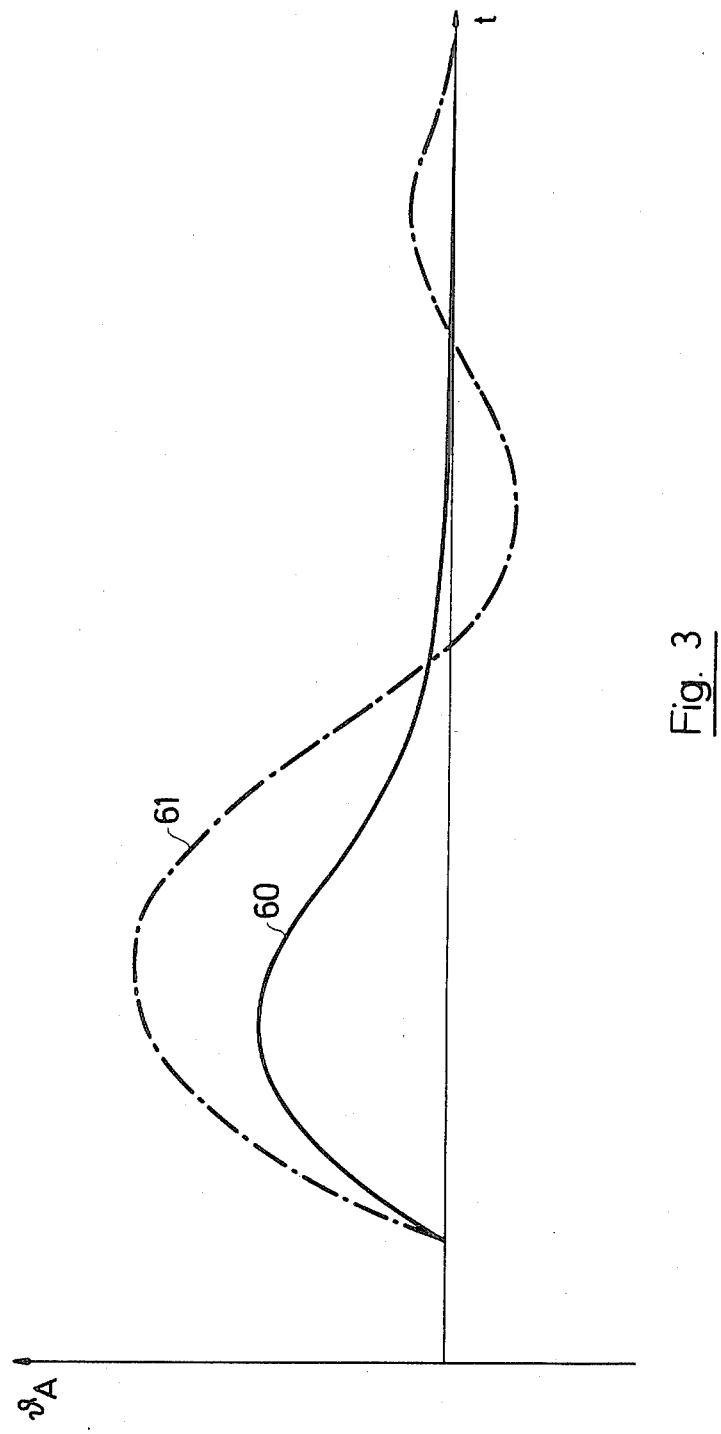
FIG. 3 graphically compares the characteristic outlet temperature curves per unit of time after a disturbance in a plant as shown in FIG. 1 with and without the use of the apparatus of the invention.

The result of the control sequence described is that the outlet temperature $\theta_A$ changes in accordance with the curve 60 shown in FIG. 3. By comparison, the curve 61 in FIG. 3 shows the outlet temperature in a plant without the use of the control circuit 20. A comparison of the two curves thus shows that the change of the outlet temperature in the plant according to FIG. 1 is less and reaches its set valve again more rapidly than in the prior art.

Figure 2:
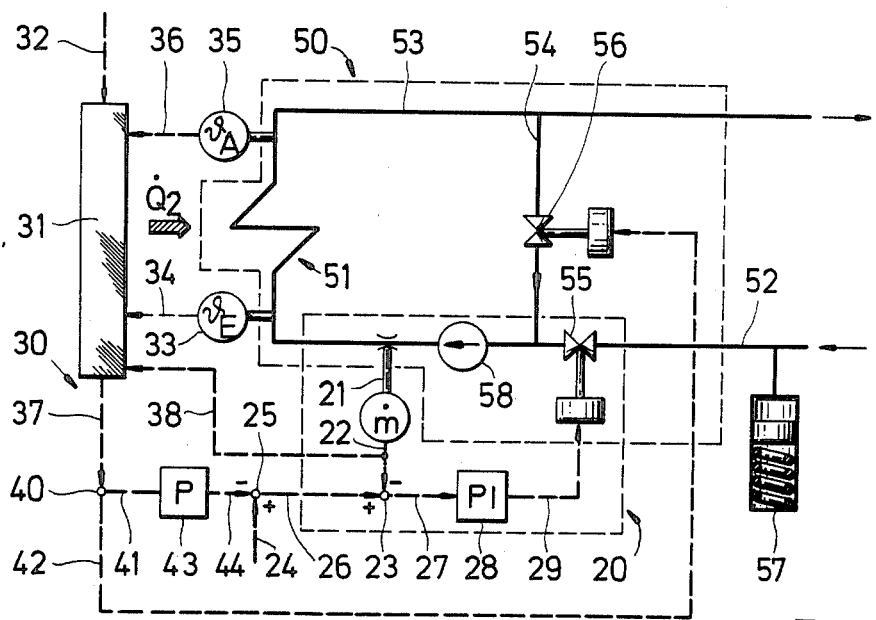
FIG. 2 illustrates a circuit diagram of modified plant for heating water constructed in accordance with the invention.

The compartor 31, which may for example have a PI characteristic, is advantageously constructed as observer Referring to FIG. 2, wherein like references characters indicate like parts as above, the plant has a controlled section 50 having a heat-exchanger 51 operating as a hot-water boiler and connected to a heat consumer (not shown) via a feed line 52 containing a circulating pump 58, and a discharge line 53. A connecting line 54 leads from the discharge line 53 to feed line 52 in parallel to the heat exchanger 51. The connecting line 54 discharges upstream of the pump 58, so that the hot water flows from the discharge line 53 to the feed line 52, i.e. in the opposite direction to the direction of flow in the heat-exchanger 51. The circulating pump 58 feeds water from the feed line 52 through the heat-exchanger 51 to the discharge line 53.

Upstream of the junction point with the connecting line 54, the feed line 52 also contains a first controllable throttle member 55 in the form of an electric motor driven valve and upstream thereof a pressure accumulator 57 is connected to the line 52 to compensate for pressure fluctuations. The connecting line 54 contains a second controllable throttle member 56 which is again a valve with an electric motor drive. A quantity of heat $Q_2$ is fed in any known manner to the heat-exchanger 51.

The control circuit 20 in this embodiment is basically the same as that in the example shown in FIG. 1 except that a signal line 38 branches from the signal line 22 and takes the output signal from the flowmeter 21 to the comparator 31 also. As a result, the comparator 31 additionally takes into consideration the quantity of water flowing through the heat-exchanger 51. This additional information increases the sensitivity of the device in comparison with that shown in FIG. 1 and, in some cases, allows an even faster reaction to any disturbances. Detection of the quantity of water flowing through the heat-exchanger 51 is particularly important in hot-water installations, because the water circulation may be considerably disturbed in the event of any vapor forming the heat-exchanger 51.

The means 30 is the same as in the exemplified embodiment according to FIG. 1 in respect of the temperature sensors 33 and 35, the set-value signal line 32, comparator 31, the output signal line 37, the branch point 40 and the signal line 42 leading to the second throttle member 56. Contrary to FIG. 1, however, in FIG. 2, the signal line 41 leading from the branch point 40 is taken to a P-member 43, the output of which is taken to a comparator 25 via a signal line 44. A signal line 24 carrying a set-value signal is also connected to this comparator 25. A differential signal formed at the comparator 25 is fed to the comparator 23 in the quantity control circuit 20 via a signal line 26.

The operation of the plant shown in FIG. 2 is basically the same as that described in FIG. 1. The control process is refined in comparison with FIG. 1 by the additional elements between the branch point 40 and the comparator 23, and a free choice is possible with respect to the quantity of water flowing.

In both exemplified embodiments, it is possible to accommodate the control circuit 20 after the heat-exchanger 11; 51. In that case, however, an additional throttle member would have to be provided to enable the supply of medium to the heat-exchanger 11; 51 to be interrupted. The provision of the first throttle member 15; 55 upstream of the junction point of the connecting line 14;54 with the feed line 12; 52 allows the medium to be shut off for inspection and repair work of the plant components downstream of the valve 15; 55.

The throttle members 15 and 16; 55 and 56 may be of redundant construction for safety reasons, and be connected in series and/or parallel.

The heat-exchanger may also be of multi-stage construction, e.g. in the form of a steam generator with a preheater, evaporator and superheater.

Apart from the process variables used in the exemplified embodiments, i.e. the temperature and quantity of flowing medium, other process variables can be measured and controlled, e.g. pressures of the medium, foreign constituent content (pollution) or phase distribution in the medium, in combination with one another as well.

If a change of the outlet temperature $\theta_A$ is desired the set value in the signal line 32 is correspondingly changed by means of a control member (not shown).

The behaviour of a plant according to FIG. 2, after a disturbance, could also be represented by FIG. 3. In this case the maximum temperatures of curves 61 and 60 are 16° C. and 8° C. respectively while the time at which the curves reach asymtotically the zero line is about 20 minutes for curve 61 and 14 minutes for curve 60.

What is claimed is:

1. In combination,
   a plant having a controlled section including a heat exchanger, a medium feed line connected to said heat exchanger to deliver a flow of medium thereto, a medium discharge line connected to said heat exchanger to discharge a flow of medium therefrom, a connecting line connected to and between said feed line and said discharge line in parallel to said heat exchanger, a first throttle member in said feed line upstream of said connecting line to control the flow therethrough and a second throttle member in said connecting line to control the flow therethrough;
   means for controlling the temperature of the medium delivered to said discharge line, said means including at least two measuring members for individually measuring two different values of the temperature of the medium at normal load of said controlled section and emitting corresponding signals and means connected to said measuring members to compare the signals therefrom and to emit a first differential signal in response to change in the difference between said emitted signals, said latter means being connected to said second throttle member to deliver said differential signal thereto to adjust the flow of medium in said connecting line; and
   a control circuit for controlling the flow of the medium in said feed line, said circuit including a third measuring member for measuring the flow of the medium in said feed line downstream of said connecting line and emitting a corresponding signal, a comparator connected to said third measuring member and to said means to emit said first differential signal to receive and compare the signals therefrom and to emit a differential signal in response to a difference therebetween, and a controller connected to and between said comparator and said first throttle member to adjust said first throttle member in response to a differential signal from said comparator whereby in response to said first differential signal, said comparator emits a second differential signal to said controller to adjust said first throttle member in an opposite sense to said second throttle member and in subsequent response to a signal from said third measuring member said comparator emits a third differential signal to said controller to adjust said first throttle member in a reverse sense.

2. The combination as set forth in claim 1 wherein said means to emit said first differential signal is an observer.

3. The combination as set forth in claim 2 wherein said controller has a PI characteristic and wherein said first differential signal from said observer to said comparator is fed through a P-member.

4. The combination as set forth in claim 2 wherein said third measuring member is connected to said observer to deliver the emitted signal thereto for comparison with the signals from said at least two measuring members.

5. The combination as set forth in claim 2 wherein a pressure accumulator is disposed in said medium feed line upstream of said first throttle member.

6. The combination as set forth in claim 2 further comprising a pump in said medium feed line between said connecting line and said heat-exchanger.

7. The combination as set forth in claim 2 wherein at least one temperature measuring member is disposed in said medium discharge line downstream of said connecting line.

8. The combination as set forth in claim 2 wherein said controller has a PI characteristic.

9. In combination,
   a plant having a controlled section including a heat exchanger, a medium feed line connected to said heat exchanger to deliver a flow of medium thereto, a medium discharge line connected to said heat exchanger to discharge a flow of medium therefrom, a first throttle member in at least one of said lines to control the flow therethrough, a connecting line connected to and between said feed line and said discharge line in parallel to said heat exchanger and a second throttle member in said connecting line to control the flow therethrough, said first throttle member positioned in at least one of said medium feed and discharge lines so as to control the total flow of medium through both said heat exchange and said connecting line;
   means for controlling a first process variable of the medium delivered to said discharge line, said means including at least two measuring members for individually measuring two different values of the first process variable and emitting corresponding signals and an observer connected to said measuring member to compare the signals therefrom and to emit a first differential signal in response to a change in the difference between said emitted signals, said observor being connected to said second throttle member to deliver said differential signal thereto to adjust the flow of medium in said connecting line; and
   a control circuit for controlling a second process variable of the medium, said circuit including a third measuring member for measuring the second process variable of the medium in said feed line downstream of said connecting line and emitting a corresponding signal, a comparator connected to said observor and said third measuring means to receive and compare said corresponding signal and said first differential signal to emit a further differential signal, a controller connected to and between said comparator and said first throttle member to adjust said first throttle member in response to said further differential signal whereby in response to said first differential signal said comparator emits a second differential signal to said controller to adjust said first throttle member in an opposite sense to said second throttle member and in subsequent response to a signal from said third measuring member said comparator emits a third differential signal to said controller to adjust said first throttle member in a reverse sense.

10. The combination as set forth in claim 9 wherein said first process variable is the temperature of the medium and the second process variable is the quantity of medium flowing through said heat-exchanger.

11. The combination as set forth in claim 9 wherein said first throttle member is disposed in said feed line to control the flow therethrough.

* * * * *

UNITED STATES PATENT AND TRADEMARK OFFICE
CERTIFICATE OF CORRECTION

PATENT NO. : 4,702,306

DATED : October 27, 1987

INVENTOR(S) : RUDOLF HERZOG

It is certified that error appears in the above-identified patent and that said Letters Patent is hereby corrected as shown below:

```
Column 1, line 28 change "measurement" to -measurements-
Column 2, line 30 change "flowing" to -flowing through-
Column 4, line 16 change "shonw" to -shown-
Column 5, line 55 change "compartor" to -comparator-
Column 5, line 56 change "as ob-" to -as an ob- -
Column 8, line 28 change "exchange" to -exchanger-
Column 8, line 35 change "member" to -members-
```

Signed and Sealed this

Twenty-sixth Day of April, 1988

Attest:

DONALD J. QUIGG

*Attesting Officer*   *Commissioner of Patents and Trademarks*